(12) United States Patent
Lal et al.

(10) Patent No.: US 11,365,313 B2
(45) Date of Patent: Jun. 21, 2022

(54) CARDANOL BLOCKED ISOCYANATE ADHESION PROMOTOR FOR PVC PLASTISOL

(71) Applicant: Evonik Operations GmbH, Essen (DE)

(72) Inventors: Gauri Sankar Lal, Whitehall, PA (US); Pritesh G. Patel, Breinigsville, PA (US); Stephen Michael Boyce, Bath, PA (US)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 16/977,859

(22) PCT Filed: Mar. 6, 2019

(86) PCT No.: PCT/EP2019/055468
§ 371 (c)(1),
(2) Date: Sep. 3, 2020

(87) PCT Pub. No.: WO2019/174972
PCT Pub. Date: Sep. 19, 2019

(65) Prior Publication Data
US 2021/0040301 A1 Feb. 11, 2021

Related U.S. Application Data

(60) Provisional application No. 62/641,377, filed on Mar. 11, 2018.

(51) Int. Cl.
*C08L 27/06* (2006.01)
*C08L 63/00* (2006.01)

(52) U.S. Cl.
CPC ............. *C08L 27/06* (2013.01); *C08L 63/00* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | | | |
|---|---|---|---|---|
| 4,977,201 A * | 12/1990 | Ogawa | ............... | C08L 27/06 525/76 |
| 4,981,889 A | 1/1991 | Baba et al. | | |
| 5,130,402 A | 7/1992 | Akiyama et al. | | |
| 5,428,087 A * | 6/1995 | Petit | ............... | C08L 75/00 524/569 |
| 6,262,148 B1 | 7/2001 | Cheng et al. | | |
| 2017/0022317 A1* | 1/2017 | Suzuki | ............... | C08G 18/8067 |
| 2017/0240691 A1 | 8/2017 | Zheng et al. | | |

FOREIGN PATENT DOCUMENTS

| | | | |
|---|---|---|---|
| CN | 103102506 | A | 5/2013 |
| CN | 107663268 | A | 2/2018 |
| EP | 0214495 | A2 | 3/1987 |
| EP | 2108668 | A1 | 10/2009 |
| GB | 1529740 | A | 10/1978 |
| WO | 200001659 | A1 | 1/2000 |
| WO | 2009080209 | A1 | 7/2009 |
| WO | 2014067096 | A1 | 5/2014 |
| WO | 2015085461 | A1 | 6/2015 |
| WO | 2015153399 | A1 | 10/2015 |
| WO | 2017140687 | A1 | 8/2017 |

OTHER PUBLICATIONS

Nasar, A. S. et al., "Synthesis and Deblocking of Cardanol- and Anacardate-Blocked Toluene Diisocyanates", Journal of Polymer Science Part A: Polymer Chemistry 2004, 42(16), 4047-4055 (Year: 2004).*
Emilie Darroman et al.: "New aromatic Amine based on cardanol giving new biobased epoxy Networks with cardanol: Amine functionalized cardanol for epoxy resins", European Journal of Lipid science and Technology, vol. 117, No. 2, 16. Oct. 2014, pp. 178-189, XP55599696.
PCT International Search Report dated Jun. 14, 2019 corresponding to PCT Application No. PCT/EP2019/055468 filed Mar. 6, 2019 (13 pages).
Antonio Greco et al.: "Use of cardanol derivaties as plasticizers for PVC : Cardanol dervived PVC plasticizers", Journal of vinyl and additive Technology, vol. 24, 2016, pp. E62-E70, XP55581996, US.

* cited by examiner

*Primary Examiner* — Richard A Huhn
(74) *Attorney, Agent, or Firm* — Andrew H. Chung; Linda S. Li; Jason S. Ngui

(57) ABSTRACT

The present invention relates to a PVC plastisol composition comprising at least one vinyl chloride polymer selected from polyvinylchlorides and copolymers of vinyl chloride with one or more monomers; at least one plasticizer; at least one epoxy resin; and at least one isocyanate resin blocked with cardanol. The PVC plastisol composition of this invention provides strong adhesion to the surface of various metals or various undercoats of metals by thermal treatment for a short time at 100° C.-200° C. and is excellent in storage stability. In addition, it offers good rheological properties with improved yield value dosing and viscosity stability during applications compared to the nonylphenol blocked isocyanate PVC adhesion promotor.

18 Claims, No Drawings

CARDANOL BLOCKED ISOCYANATE ADHESION PROMOTOR FOR PVC PLASTISOL

This Application is a § 371 national stage of PCT International Application No. PCT/EP2019/055468, filed Mar. 6, 2019, which claims the benefit of U.S. Application No. 62/641,377, filed Mar. 11, 2018, the contents of each of which are hereby incorporated by reference in their entirety into this application.

BACKGROUND OF THE INVENTION

Plastisols are dispersions of organic plastics in plasticizers which gel on heating and cure on cooling. PVC plastisols consist of powdered homo or co-polymers of vinyl chloride which are dispersed in a liquid plasticizer to form a paste and used as such in a variety of applications. These include sealing compositions for seams on metals (underseals of motor vehicles) for corrosion protection as well as flange seam adhesives on metal containers. It is also used for coating textile materials such as the backing of carpets and as cable insulators. PVC plastisols are also used for construction of automobile shells, lining reinforcing structures such as engine hoods, door and roof construction and for gluing flange seals and sealing seams in motor vehicles. The advantage of PVC plastisols for these applications is related to to their favorable flow properties at room temperature.

Additives are added to the plastisols to facilitate their intended use. Such additives are for example, rheology auxiliaries, stabilizers, adhesion promotors, fillers, pigments, blowing agents, reactive additives capable of crosslinking and water-absorbing substances. Adhesion promotors are also added to plastisols to enhance the adhesion to steel, aluminium, or galvanized and/or electrodip-coated or otherwise pre-treated metal sheets.

Polyaminoamides are commonly used as adhesion promotors for PVC plastisol. Other adhesion promotors include epoxy resins, dicyandiamide, 1-benzyldimethyldiamine, imine and enamines of polyaminoamides with epoxy resins. The use of blocked isocyanates polymers either alone or in combination with amine derivatives or polyaminoamides have been described in EP A-214495 and U.S. Pat. No. 5,130,402.

Blocked isocyanates are widely used as adhesion promotors for PVC plastisols. These isocyanates can be blocked with a variety of compounds including, phenols, caprolactams and pyrazoles. The phenol blocked isocyanates and in particular nonylphenol blocked isocyanates are one of the more popular compounds used in PVC plastisol for promoting adhesion to metal substrates in automobile manufacturing. These phenols possess poor environmental and health profiles and their use in industry is currently being restricted.

It is desirable to achieve a blocking agent for isocyanates which is safer to handle and does not adversely affect the health of workers using these products. This invention is based on using cardanol, an extract of cashew nut shell (cashew nut shell liquid, CNSL) as a blocking agent for blocking isocyanates. This composition has been found to be an excellent replacement for nonylphenol for the production of adhesion promotors for use with PVC platisols.

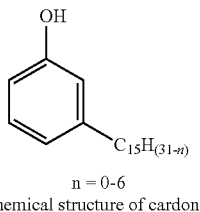

n = 0-6
Chemical structure of cardonal

BRIEF SUMMARY OF THE INVENTION

This invention solves the health and safety problems associated with the use of nonylphenol for blocking isocyanates that function as adhesion promotors for applications of PVC plastisols. The PVC plastisol composition of this invention comprises the following components:
  (a) at least one vinyl chloride polymer selected from polyvinylchlorides and copolymers of vinyl chloride with one or more monomers;
  (b) at least one plasticizer;
  (c) at least one epoxy resin; and
  (d) at least one isocyanate resin blocked with cardanol.

The PVC plastisol composition of this invention provides strong adhesion to the surface of various metals or various undercoats of metals by thermal treatment for a short time at 100° C.-200° C. and is excellent in storage stability. In addition, it offers good rheological properties with improved yield value dosing and viscosity stability during applications compared to the nonylphenol blocked isocyanate PVC adhesion promotor.

DETAILED DESCRIPTION OF THE INVENTION

The vinyl chloride polymer and/or copolymer of the present invention may be any conventional one. Examples thereof include copolymers comprising vinyl chloride and a co-monomer such as vinyl acetate, maleic anhydride, maleate or vinyl ether. The degree of polymerization of the vinyl chloride polymer or copolymer may be generally 1000 to 1700. These (co)polymers may also be used as a mixture of two or more of them.

The plasticizer used in the present invention may be any one conventionally used for a polyvinyl chloride plastisol. Preferable plasticizers include phthalates such as diethyl phthalate, dibutyl phthalate, di-2-ethylhexyl phthalate, dioctyl phthalate, di-isononyl phthalate, dilauryl phthalate and distearyl phthalate; mixed alkyl phthalates, preferably those wherein the alkyl groups each have 7 to 11 carbon atoms (hereinafter abbreviated to "C7-11 alkyl"), butyl benzyl phthalate and hexyl benzyl phthalate; adipates such as di-2-ethylhexyl adipate and dioctyl adipate; sebacates such as dioctyl sebacate; phosphates such as tricresyl phosphate and triphenyl phosphate; trimellitates such as mixed C7-11 alkyl trimellitates; and mixtures of any two or more thereof. Among them, phthalates are preferred and dioctyl phthalate is particularly preferred.

The isocyanate compound to be used for preparing the blocked isocyanate according to the present invention preferably includes polyisocyanates, polyisocyanate polymers, mixtures of the both, urethane prepolymer of polyisocyanates or polyisocyanate polymers and mixtures of two or more of them.

Preferable examples of the polyisocyanates include diisocyanates represented by the general formula shown below where A is a benzene or naphthalene ring;

—NCO is a nuclear substituent isocyanate group; Z is a nuclear substituent halogen atom or alkyl or alkoxyl group having at most 3 carbon atoms and n is 0, 1 or 2, more preferably 2,4-toluene diisocyanate, 2,6-toluene diisocyanate, 1,4-naphthylene diisocyanate, 1,5-naphthylene diisocyanate, 1,3-phenylene diisocyanate, 1,4-phenylene diisocyanate or 1-isopropylbenzene 2,4-di isocyanate;
diisocyanates represented by the general formula:

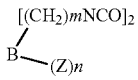

wherein B is a benzene or naphthalene ring; —$(CH_2)m$ NCO is a nuclear substituent alkylene isocyanate group; Z is a nuclear substituent halogen atom or alkyl or alkoxy group having at most 3 carbon atoms; m is 1 or 2 and n is 1 or 2, more preferably ω,ω'-diisocyanate-1,2-dimethylbenzene or ω,ω'-diisocyanate-1,3-dimethylbenzene; diisocyanates represented by the general formula:

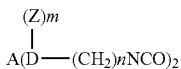

wherein A is an alkylene group having at least 3 carbon atoms; D is a benzene or naphthalene ring; Z is a nuclear substituent halogen atom or alkyl or alkoxy group having at most 3 carbon atoms and n is 0, 1 or 2, more preferably 4,4'-diphenylmethane diisocyanate, 2,2'-dimethyldiphenylmethane 4,4'-diisocyanate, diphenyldimethylmethane 4,4'-diisocyanate and 3,3'-dichlorodiphenyldimethylmethane 4,4'-diisocyanate;
diisocyanates represented by the general formula:

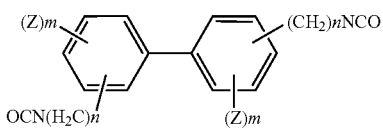

wherein Z is a nuclear substituent halogen atom or alkyl or alkoxy group having at most 3 carbon atoms; m is 0 or 1 and n is 0, 1 or 2, preferably biphenyl 2,4'-diisocyanate, biphenyl 4,4'-diisocyanate, 3,3'-dimethylbiphenyl 4,4'-diisocyanate and 3,3'-dimethoxybiphenyl 4,4'-diisocyanate;
diisocyanates obtained by hydrogenating the aromatic rings of the above isocyanates (preferably dicyclohexane 4,4'-diisocyanate, ω,ω'-diisocyanate-1,2-dimethylbenzene and ω,ω'-diisocyanate-1,3-dimethylbenzene;
diisocyanates having a substituted urea group which are prepared by the reaction of 2 mol of diisocyanate with 1 mol of water (preferably urea diisocyanate, e.g. prepared by the reaction of 2 mol of 2,4-toluene diisocyanate with 1 mol of water);
uretedione diisocyanates, e.g. prepared by the conventional dimerization of aromatic diisocyanates; or
propane 1,2-diisocyanate, 2,3-dimethylbutane 2,3-diisocyanate, 2-methylpentane 2,4-diisocyanate, octane 3,6-diisocyanate, 3,3-dinitropentane 1,5-diisocyanate, octane 1,6-diisocyanate or hexamethylene diisocyanate, among which aromatic polyisocyanates such as toluene diisocyanate and diphenylmethane diisocyanate are particularly preferred.

The polyisocyanate polymer according to the present invention can be prepared by polymerizing a polyisocyanate as described above, preferably toluene diisocyanate, diphenylmethane diisocyanate or hexamethylene diisocyanate, in an inert solvent such as methyl acetate, ethyl acetate, butyl acetate, methyl ethyl ketone or dioxane or in a plasticizer in the presence of an ordinary catalyst such as tertiary amine, Mannich base, alkali metal salt of fatty acid or alcoholate according to a conventional method. Examples of the plasticizer to be used include phthalates such as diethyl phthalate, dibutyl phthalate, di-2-ethylhexyl phthalate, dioctyl phthalate, di-isononyl phthalate, dilauryl phthalate and distearyl phthalate, mixed alkyl phthalates wherein the alkyl groups each have 7 to 11 carbon atoms (hereinafter abbreviated to "C7-11 alkyl"), butyl benzyl phthalate and hexyl benzyl phthalate; phosphates such as tricresyl phosphate and triphenyl phosphate; adipates such as di-2-ethylhexyl adipate and dioctyl adipate; sebacates such as dioctyl sebacate; and trimellitates such as mixed C7-11 alkyl trimellitates. When the polymerization is carried out in a highly volatile solvent, it is preferable to finally replace the volatile solvent with a suitable high-boiling solvent such as a plasticizer. It is preferable to carry out the polymerization of polyisocyanate in a phthalate plasticizer, still preferably, dialkyl phthalate or alkyl benzyl phthalate, wherein the alkyl has at least seven carbon atoms.

The urethane prepolymer according to the present invention can be prepared by reacting a polyhydroxyl compound such as polyether polyol, polyester polyol or a mixture thereof with an excess of an aromatic polyisocyanate, polyisocyanate polymer or a mixture thereof as described above according to an ordinary process for preparing an NCO-containing urethane prepolymer.

Examples of the polyether polyol include compounds represented by the general formula:

$$R[(OR1)n\ OH]p$$

wherein R is a polyhydric alcohol residue; $(OR1)n$ is a polyoxyalkylene chain comprising an oxyalkylene group having 2 to 4 carbon atoms; n is the degree of polymerization of the polyoxyalkylene chain and is a number corresponding to a molecular weight of 100 to 4500 and p is preferably 2 to 4.

Examples of the polyhydric alcohol corresponding to the polyhydric alcohol residue in the above formula include aliphatic dihydric alcohols such as ethylene glycol, propylene glycol, 1,4-butylene glycol and neopentane glycol; trihydric alcohols such as glycerin, trihydroxyisobutane, 1,2,3-butanetriol, 1,2,3-pentanetriol, 2-methyl-1,2,3-propanetriol, 2-methyl-2,3,4-butanetriol, 2-ethyl-1,2,3-butanetriol, 2,3,4-pentanetriol, 2,3,4-hexanetriol, 4-propyl-3,4,5-heptanetriol, 2,4-dimethyl-2,3,4-pentanetriol, pentamethylglycerin, pentaglycerin, 1,2,4-butanetriol, 1,2,4-pentanetriol and trimethylolpropane; tetrahydric alcohols such as erythritol, pentaerythritol, 1,2,3,4-pentanetetrol, 2,3,4,5- hexanetetrol, 1,2,3,5-pentanetetrol and 1,3,4,5-hexanetetrol and pentahydric alcohols such as adonitol, arabitol and xylitol and hexahydric alcohols such as sorbitol, mannitol and iditol. Among these polyhydric alcohols, alcohols having 2 to 4 hydroxyl groups are preferred and propylene glycol and glycerin are particularly preferred.

The polyether polyol of the above general formula can be prepared by reacting a polyhydric alcohol as described above with an alkylene oxide having 2 to 4 carbon atoms according to an ordinary process in such a way as to give an adduct having a desired molecular weight. Examples of the alkylene oxide having 2 to 4 carbon atoms include ethylene oxide, propylene oxide and butylene oxide, among which propylene oxide is particularly preferred.

The above polyester polyol includes ordinary polyesters prepared from polycarboxylic acids and polyhydric alcohols and polyesters prepared from lactams. Examples of the polycarboxylic acid include benzenetricarboxylic, adipic, succinic, suberic, sebacic, oxalic, methyladipic, glutaric, pimelic, azelaic, phthalic, terephthalic, isophthalic, thiodipropionic, maleic, fumaric, citraconic, itaconic and other suitable carboxylic acids. Examples of the polyhydric alcohol include ethylene glycol, propylene glycol, 1,4-butanediol, 1,3-butanediol, 1,5-pentanediol, 1,6-hexanediol, bis(hydroxymethylchlorohexane), diethylene glycol, 2,2-dimethylpropylene glycol, 1,3,6-hexanetriol, trimethylolpropane, pentaerythritol, sorbitol, glycerin and other suitable polyhydric alcohols. Further, polytetramethylene glycol and polycaprolactone glycol may be used as the polyhydroxyl compound.

The urethane prepolymer according to the present invention can be prepared by reacting a polyhydroxyl compound as described above, for example, polyether polyol, polyester polyol, mixture of them or mixture thereof with OH-containing glyceride such as castor oil with a polyisocyanate, polyisocyanate polymer or mixture of them. In the preparation of the urethane prepolymer according to the present invention, the molar ratio of the aromatic polyisocyanate, aromatic polyisocyanate polymer or mixtures of them to the polyhydroxyl compound is between 1.5:1 and 3.5:1. In another embodiment, the molar ratio of the aromatic polyisocyanate, aromatic polyisocyanate polymer or mixtures of them to the polyhydroxyl compound is between 2.0:1 and 3.0:1. The NCO content (percentage) of the prepolymer is generally 1 to 20%. In another embodiment, the NCO content (percentage) of the prepolymer is 2 to 15%.

The urethane prepolymer can be prepared by a conventional process. The reaction is generally carried out at a temperature of 40° to 110° C. In another embodiment, the reaction is carried out at a temperature of 50° to 100° C. In the preparation of the urethane prepolymer, a conventional catalyst for the preparation of urethane may be used. Examples of the catalyst include organometallic compounds such as dibutyltin dilaurate, stannous octoate, lead octoate, lead naphthenate and zinc octoate and tertiary amines such as triethylenediamine and triethylamine.

The epoxy resin of this composition describes compounds containing 2 or more 1,2-epoxy groups per molecule. The epoxy resin is preferably selected from the group consisting of aromatic epoxy resin, alicyclic epoxy resin, aliphatic epoxy resin, glycidyl ester resin, thioglycidyl ether resin, N-glycidyl ether resin, and combinations thereof.

Preferable aromatic epoxy resin suitable for use in the present disclosure comprises the glycidyl ethers of polyhydric phenols, including the glycidyl ethers of dihydric phenols. Further preferred are the glycidyl ethers of resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (commercially known as bisphenol A), bis-(4-hydroxyphenyl)-methane (commercially known as bisphenol F, and which may contain varying amounts of 2-hydroxyphenyl isomers), novolac resins, and the like, or any combination thereof. Additionally, advanced dihydric phenols of the following structure also are useful in the present disclosure:

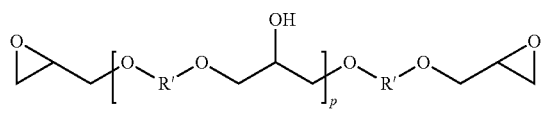

wherein R' is a divalent hydrocarbon radical of a dihydric phenol, such as those dihydric phenols listed above, and p is an average value between 0 and about 7. Materials according to this formula may be prepared by polymerizing mixtures of a dihydric phenol and epichlorohydrin, or by advancing a mixture of a diglycidyl ether of the dihydric phenol and the dihydric phenol. While in any given molecule the value of p is an integer, the materials are invariably mixtures which may be characterized by an average value of p which is not necessarily a whole number. Polymeric materials with an average value of p between 0 and about 7 may be used in one aspect of the present disclosure.

In one aspect of the present disclosure at least one multifunctional epoxy resin is a diglycidyl ether of bisphenol-A (DGEBA), an advanced or higher molecular weight version of DGEBA, a diglycidyl ether of bisphenol-F, a diglycidyl ether of novolac resin, or any combination thereof. Higher molecular weight versions or derivatives of DGEBA are prepared by the advancement process, where excess DGEBA is reacted with bisphenol-A to yield epoxy terminated products. The epoxy equivalent weights (EEW) for such products range from about 450 to about 3000 or more. Because these products are solid at room temperature, they are often referred to as solid epoxy resins.

In preferred embodiments, at least one multifunctional epoxy resin is the diglycidyl ether of bisphenol-F or bisphenol-A represented by the following structure:

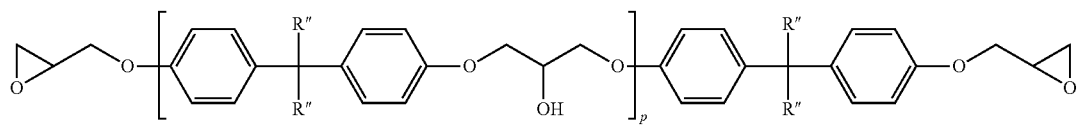

wherein R"=H or $CH_3$, and p is an average value between 0 and about 7. DGEBA is represented by the above structure when R"=$CH_3$ and p=0. DGEBA or advanced DGEBA resins are often used in coating formulations due to a combination of their low cost and generally high performance properties. Commercial grades of DGEBA having an EEW ranging from about 174 to about 250, and more commonly from about 185 to about 195, are readily available. At these low molecular weights, the epoxy resins are liquids and are often referred to as liquid epoxy resins. It is understood by those skilled in the art that most grades of liquid epoxy resin are slightly polymeric, since pure DGEBA has an EEW of about 174. Resins with EEWs between about 250 and about 450, also generally prepared by the advancement process, are referred to as semi-solid epoxy resins because they are a mixture of solid and liquid at room temperature. Generally, multifunctional resins with EEWs based on solids of about 160 to about 750 are useful in the present disclosure. In another aspect the multifunctional epoxy resin has an EEW in a range from about 170 to about 250.

Examples of alicyclic epoxy compounds include, but are not limited to, polyglycidyl ethers of polyols having at least one alicyclic ring, or compounds including cyclohexene oxide or cyclopentene oxide obtained by epoxidizing compounds including a cyclohexene ring or cyclopentene ring with an oxidizer. Some particular examples include, but are not limited to hydrogenated bisphenol A diglycidyl ether; 3,4-epoxycyclohexylmethyl-3,4-epoxycyclohexyl carboxylate; 3,4-epoxy-1-methylcyclohexyl-3,4-epoxy-1-methylhexane carboxylate; 6-methyl-3,4-epoxycyclohexylmethyl-6-methyl-3,4-epoxycyclohexane carboxylate; 3,4-epoxy-3-methylcyclohexylmethyl-3,4-epoxy-3-methylcyclohexane carboxylate; 3,4-epoxy-5-methylcyclohexylmethyl-3,4-epoxy-5-methylcyclohexane carboxylate; bis(3,4-epoxycyclohexylmethyl)adipate; methylene-bis(3,4-epoxycyclohexane); 2,2-bis(3,4-epoxycyclohexyl)propane; dicyclopentadiene diepoxide; ethylene-bis(3,4-epoxycyclohexane carboxylate); dioctyl epoxyhexahydrophthalate; and di-2-ethylhexyl epoxyhexahydrophthalate.

Examples of aliphatic epoxy compounds include, but are not limited to, polyglycidyl ethers of aliphatic polyols or alkylene-oxide adducts thereof, polyglycidyl esters of aliphatic long-chain polybasic acids, homopolymers synthesized by vinyl-polymerizing glycidyl acrylate or glycidyl methacrylate, and copolymers synthesized by vinyl-polymerizing glycidyl acrylate or glycidyl methacrylate and other vinyl monomers. Some particular examples include, but are not limited to, glycidyl ethers of polyols, such as 1,4-butanediol diglycidyl ether; 1,6-hexanediol diglycidyl ether; a triglycidyl ether of glycerin; a triglycidyl ether of trimethylol propane; a tetraglycidyl ether of sorbitol; a hexaglycidyl ether of dipentaerythritol; a diglycidyl ether of polyethylene glycol; and a diglycidyl ether of polypropylene glycol; polyglycidyl ethers of polyether polyols obtained by adding one type, or two or more types, of alkylene oxide to aliphatic polyols, such as ethylene glycol, propylene glycol, trimethylol propane, and glycerin.

Glycidyl ester resins are obtained by reacting a polycarboxylic acid compound having at least two carboxyl acid groups in the molecule and epichlorohydrin. Examples of such polycarboxylic acids include aliphatic, cycloaliphatic, and aromatic polycarboxylic acids. Examples of aliphatic polycarboxylic acids include oxalic acid, succinic acid, glutaric acid, adipic acid, pimelic acid, sebacic acid, suberic acid, azelaic acid, and dimerised or trimerised linoleic acid. Cycloaliphatic polycarboxylic acids include tetrahydrophthalic acid, 4-methyltetrahydrophthalic acid, hexahydrophthalic acid, and 4-methylhexahydrophthalic acid. Aromatic polycarboxylic acids include phthalic acid, isophthalic acid, and terephthalic acid. Thioglycidyl ether resins are derived from dithiols, for example, ethane-1,2-dithiol or bis(4-mercaptomethylphenyl) ether.

N-glycidyl resins are obtained by dehydrochlorination of the reaction products of epichlorohydrin with amines containing at least two amine hydrogen atoms. Such amines are, for example, aniline, n-butylamine, bis(4-aminophenyl) methane, m-xylylenediamine, and bis(4-methylaminophenyl)methane. The N-glycidyl resins also include, however, triglycidyl isocyanurate, N,N'-diglycidyl derivatives of cycloalkylene ureas, e.g., ethylene urea or 1,3-propylene urea, and diglycidyl derivatives of hydantoins, e.g., 5,5-dimethylhydantoin.

The blocking agent used in the preparation of the blocked isocyanate is cardanol. The blocking, in preparing the blocked isocyanate, is carried out by a conventional process. The amount of the blocking agent used is preferably 1 to 2 times by equivalent as much as the free isocyanate group. In another preferred embodiment, the amount of the blocking agent used is 1.05 to 1.5 times by equivalent as much as the free isocyanate group.

The blocked isocyanate may be one or more members selected from among the abovementioned blocked aromatic polyisocyanate compounds, blocked aromatic polyisocyanate polymers and blocked urethane prepolymers.

The plastisol composition of the present invention may contain other various additives such as filler or stabilizer in addition to the above components. Examples of the filler include inorganic ones such as calcium carbonate, talc, diatomaceous earth and kaolin and organic ones such as cellulose powder, rubber powder and reclaimed rubber. Examples of the stabilizer include metal soaps such as calcium stearate and aluminum stearate; salts of inorganic acids such as dibasic phosphites and dibasic sulfates and organometallic compounds such as dibutyltin dilaurate and dibutyltin maleate. Further, the composition may also contain a coloring agent such as pigment.

The polyvinyl chloride plastisol composition of the present invention can be prepared by conventional kneading.

The composition of the present invention is applicable to the surface of various metals and various undercoats of metals and is also applicable to the surface of a cationic electro-deposit. As described above, the polyvinyl chloride plastisol composition of the present invention can strongly adhere to the surface of various metals or various undercoats (such as cationic electro-deposit) of metals by baking at a temperature of 120° to 200° C. for 30 minutes or shorter; is excellent in adhesion; causes neither discoloration nor color deterioration even by high-temperature treatment; and is excellent in storage stability. Therefore, the plastisol composition of the present invention is useful as a body sealer or undercoat for an automotive body.

The following invention is directed to the following aspects:

<1> A plastisol composition comprising (a) at least one vinyl chloride polymer selected from the group consisting of polyvinylchlorides and copolymers of vinyl chloride with one or more monomers; (b) at least one plasticizer; (c) at least one epoxy resin; and (d) at least one isocyanate resin blocked with cardanol.

<2> The plastisol composition of aspect <1> wherein the at least one isocyanate is a polyisocyanate, polyisocyanate polymer, urethane prepolymer of polyisocyanate or polyisocyanate polymer, or a mixture thereof.

<3> The plastisol composition of aspect <2> wherein the polyisocyanate is a diisocyanate represented by the general formula:

wherein A is a benzene or naphthalene ring; NCO is a nuclear substituent isocyanate group; Z is a nuclear substituent halogen atom or alkyl or alkoxyl group having at most 3 carbon atoms and n is 0, 1 or 2.

<4> The plastisol composition of aspect <3> wherein the diisocyanate is selected from the group consisting of 2,4-toluene diisocyanate, 2,6-toluene diisocyanate, 1,4-naphthylene diisocyanate, 1,5-naphthylene diisocyanate, 1,3-phenylene diisocyanate, 1,4-phenylene diisocyanate, and 1-isopropylbenzene 2,4-diisocyanate.

<5> The plastisol composition of aspect <2> wherein the polyisocyanate is a diisocyanate represented by the general formula:

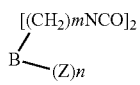

wherein B is a benzene or naphthalene ring; $(CH_2)_m$ NCO is a nuclear substituent alkylene isocyanate group; Z is a nuclear substituent halogen atom or alkyl or alkoxy group having at most 3 carbon atoms; m is 1 or 2 and n is 1 or 2.

<6> The plastisol composition of aspect <5> wherein the diisocyanate is selected from the group consisting of ω,ω'-diisocyanate-1,2-dimethylbenzene, and ω,ω'-diisocyanate-1,3-dimethylbenzene.

<7> The plastisol composition of aspect <2> wherein the polyisocyanate is a diisocyanate represented by the general formula:

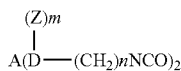

wherein A is an alkylene group having at least 3 carbon atoms; D is a benzene or naphthalene ring; Z is a nuclear substituent halogen atom or alkyl or alkoxy group having at most 3 carbon atoms and n is 0, 1 or 2.

<8> The plastisol composition of aspect <7> wherein the diisocyanate is selected from the group consisting of 4,4'-diphenylmethane diisocyanate, 2,2'-dimethyldiphenylmethane 4,4'-diisocyanate, diphenyldimethylmethane 4,4'-diisocyanate, and 3,3'-dichlorodiphenyldimethylmethane 4,4'-diisocyanate.

<9> The plastisol composition of aspect <2> wherein the polyisocyanate is a diisocyanate represented by the general formula:

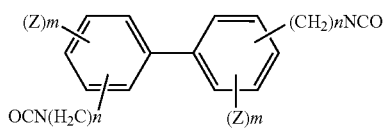

wherein Z is a nuclear substituent halogen atom or alkyl or alkoxy group having at most 3 carbon atoms; m is 0 or 1 and n is 0, 1 or 2.

<10> The plastisol composition of aspect <9> wherein the diisocyanate is selected from the group consisting of biphenyl 2,4'-diisocyanate, biphenyl 4,4'-diisocyanate, 3,3'-dimethylbiphenyl 4,4'-diisocyanate, and 3,3'-dimethoxybiphenyl 4,4'-diisocyanate.

<11> The plastisol composition of aspect <1> wherein the at least one plasticizer is selected from the group consisting of phthalates, mixed alkyl phthalates, adipates, sebacates, phosphates, trimellitates, and combinations thereof.

<12> The plastisol composition of aspect <1> wherein the at least one epoxy resin is selected from the group consisting of aromatic epoxy resin, alicyclic epoxy resin, aliphatic epoxy resin, glycidyl ester resin, thioglycidyl ether resin, N-glycidyl ether resin, and combinations thereof.

<13> The plastisol composition of aspect <12> wherein the at least one epoxy resin comprises a glycidyl ether of polyhydric phenol.

<14> The plastisol composition of aspect <12> wherein the at least one epoxy resin comprises at least one glycidyl ether selected from the group of glycidyl ethers of: resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane, bis-(4-hydroxyphenyl)-methane, novolac resins, and combinations thereof.

<15> The plastisol composition of aspect <12> wherein the at least one epoxy resin comprises at least one dihydric phenol of the following structure:

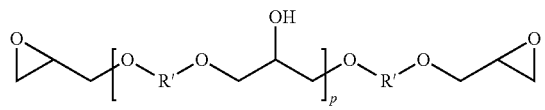

wherein R' is a divalent hydrocarbon radical of a dihydric phenol, and p is an average value between 0 and about 7.

<16> The plastisol composition of aspect <12> wherein the at least one epoxy resin comprises at least one of the diglycidyl ethers of bisphenol-A, the advanced diglycidyl ethers of bisphenol-A, and the diglycidyl ethers of bisphenol-F.

<17> The plastisol composition of aspect <16> wherein the at least one epoxy resin comprises at least one multifunctional epoxy resin of the following structure:

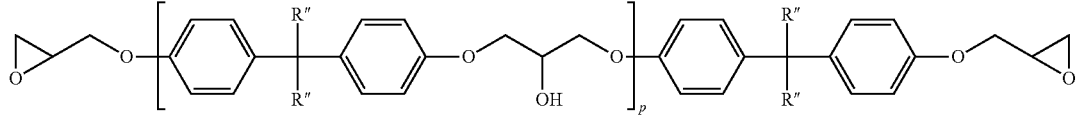

wherein R" is H or $CH_3$, and p is an average value between 0 and about 7.

<18> The plastisol composition of aspect <1> wherein the amount of cardanol used is 1 to 2 times by equivalent as much as the free isocyanate group.

EXAMPLES

These Examples are provided to demonstrate certain aspects of the invention and shall not limit the scope of the claims appended hereto.

Example 1: Preparation of Cardanol Blocked Isocyanate Compositions

Diisodecylphthalate (294.16 g) and cardanol (80.16 g, 0.27 mole) were charged to a dry reactor. The mixture was dried under vacuum (10 mm Hg) and nitrogen sparge to achieve <0.03 wt. % water. It was then heated to 77-82° C. The polyisocyanate (Coronate 2030*), (117 g, 50% in butyl acetate) and Dabco T-12 (0.15 g) were then added. The butyl acetate was distilled at <132-135° C. The temperature of the mixture was reduced to 55° C. and EPON 828 (77.12 g, 0.20 mole) added at <55-60° C. The product was cooled to room temperature.

Example 2: Preparation of Cardanol Blocked Isocyanate Compositions with 10% Less Isocyanate Diisodecylphthalate (294.16 g) and cardanol (80.16 g, 0.27 mole) were charged to a dry reactor. The mixture was dried under vacuum (10 mm Hg) and nitrogen sparge to achieve <0.03 wt. % water. It was then heated to 77-82° C. The polyisocyanate (Coronate 2030*), (105 g, 50% in butyl acetate) and Dabco T-12 (0.15 g) were then added. The butyl acetate was distilled at <132-135° C. The mixture was cooled to 55° C. and EPON 828 (77.12 g, 0.20 mole) added at <55-60° C. The product was cooled to room temperature.

Example 3: Preparation of Cardanol Blocked Isocyanate Compositions with 10% More Isocyanate Diisodecylphthalate (294.16 g) and cardanol (80.16 g, 0.27 mole) were charged to a dry reactor. The mixture was dried under vacuum (10 mm Hg) and nitrogen sparge to achieve <0.03 wt. % water. It was then heated to 77-82° C. The polyisocyanate (Coronate 2030*), (129 g, 50% in butyl acetate) and Dabco T-12 (0.15 g) were then added. The butyl acetate was distilled at <132-135° C. The mixture was cooled to 55° C. and EPON 828 (77.12 g, 0.20 mole) added at <55-60° C. The product was cooled to room temperature.

*Coronate 2030 is a product of Tosoh Corporation.

Example 4

Preparation of PVC Plastisol Composition

| Component | Function | Amount (%) |
| --- | --- | --- |
| DINP | Plasticizer | 30 |
| PVC - Vestolit 1353 K | PVC - homo | 7.5 |
| PVC- Lacovyl PA 1384 | PVC - copolymer | 5 |
| PVC - Vinnolit SA 1062/7 | PVC - copolymer | 17.5 |
| Socal 312 | Coated chalk | 16 |
| Ulmer Weiss XM | Natural chalk | 16 |
| Aerosil 200 | Thixotropic agent | 0.5 |
| CaO | Drying agent | 2 |
| Zinc Oxide | Stabilizer | 0.2 |
| Exxsol D 80 | Solvent | 4.3 |
| Product from Examples 1-3 | Adhesion Promoter | 5-7% |

Example 5

Adhesion of Cardanol-Blocked Isocyanate Adhesion Promotor in PVC Plastisol with Metal Substrates The adhesion promotors of examples 1-3 were thoroughly mixed with the plastisol in a beaker with a spatula to obtain the formulation of example 4. This formulated plastisol was applied with a length of 8 cm and a layer thickness increasing from 0 mm to 3 mm across the length of the substrate. Three commercial substrates were used (U32AD800, Cormax 6EP and Cormax 6 Ecoat). The specimens were cured for 30 minutes at 130° C. Adhesion test was performed after cooling for 1 hour and after 24 hours. Two parallel strips were cut beginning at the thick (3 mm) side. A special scraper was then used to go underneath the sealant to scrape ~1 cm of sealant. The two strips were then pulled away from the substrate to test adhesion. The adhesion promotors of example 1-3 showed similar adhesion to that of Nourybond 289, a nonylphenol blocked isocyanate commercial adhesion promotor sold by Evonik Industries AG (Table 1).

TABLE 1

Adhesion study of adhesion promotors of Example 1-3 versus control (Nourybond 289)
Manual Adhesion test Results

| | | Substrate | | |
| --- | --- | --- | --- | --- |
| Product ID | | U32AD800 (BASF) | Cormax 6EP (Axalta) | Cormax 6 Ecoat (Axalta) |
| Nourybond 289 | Sample -1 | Pass | Pass | Pass |
| | Sample -2 | Pass | Pass | Pass |
| | Sample -3 | Pass | Pass | Pass |
| | Sample -4 | Pass | Pass | Pass |
| | Sample -5 | Pass | Pass | Pass |
| Example-1 | Sample -1 | Pass | Pass | Pass |
| | Sample -2 | Pass | Pass | Pass |
| | Sample -3 | Pass | Pass | Pass |
| | Sample -4 | Pass | Pass | Pass |
| | Sample -5 | Pass | Pass | Pass |
| Example-2 | Sample -1 | Pass | Pass | Pass |
| | Sample -2 | Pass | Pass | Pass |
| | Sample -3 | Pass | Pass | Pass |
| | Sample -4 | Pass | Pass | Pass |
| | Sample -5 | Pass | Pass | Pass |
| Example-3 | Sample -1 | Pass | Pass | Pass |
| | Sample -2 | Pass | Pass | Pass |
| | Sample -3 | Pass | Pass | Pass |
| | Sample -4 | Pass | Pass | Pass |
| | Sample -5 | Pass | Pass | Pass |

Example 6

Rheology Study of Cardanol-Blocked Isocyanate Adhesion Promotor in PVC Plastisol Rheology measurements were carried out using the Anton Paar MCR302 instrument at 25° C. using a Z4 spindle with a special cup. A typical procedure is as follows: One gram of Nourybond 289 was mixed with 99 grams of the standard plastisol above and stirred with a spatula. The cup was filled and after 24 h the stress was measured using a shear rate gradient applied from 1 1/s to 400 1/s. The system was held at the 400 1/s shear rate for 180 seconds. Then the gradient goes from 400 1/s to 1 1/s while the stress was measured. A graph is plotted of stress with increasing and decreasing shear rate and the last line is extrapolated to measure the yield point. From the whole plot the area is calculated. This method was repeated with adhesion promotors from examples 1-3.

TABLE 2

Rheology performance of Nourybond 289
Control

| Sample | | PVC PS | | |
|---|---|---|---|---|
| Adhesion Promoter (Nourybond 289) | | 0.0 | 2.0 | 5.0 |
| Oscillating rheology | | | | |
| Yield value Dosing (Pa) | Crossover | 961 | 699 | 590 |
| Yield value Sag resistance (Pa) | Crossover | 351 | 305 | 260 |
| Viscoelasticity G" (Pa) | G" @ 840 s | 529 | 372 | 300 |
| Flow behavior during application (Pa · s) | η @ 720 s | 48.0 | 45.1 | 39.2 |
| Viscosity decrease (Pa · s) | | 12.0 | 15.5 | 15.8 |
| Flow behavior after application | η @ 980 s | 190.0 | 121.0 | 92.6 |

TABLE 3

Rheology performance of adhesion promotor of example 1
Example 1

| Sample | | PVC PS | | |
|---|---|---|---|---|
| Adhesion Promoter (wt. %) | | 0.0 | 2.0 | 5.0 |
| Oscillating rheology | | | | |
| Yield value Dosing (Pa) | Crossover | 961 | 641 | 530 |
| Yield value Sag resistance (Pa) | Crossover | 351 | 299 | 252 |
| Viscoelasticity G" (Pa) | G" @ 840 s | 529 | 344 | 253 |
| Flow behavior during application (Pa · s) | η @ 720 s | 48.0 | 41.8 | 36.3 |
| Viscosity decrease (Pa · s) | | 12.0 | 13.7 | 12.3 |
| Flow behavior after application | η @ 980 s | 190.0 | 116.0 | 84.9 |

TABLE 4

Rheology performance of adhesion promotor of example 2
Example 2

| Sample | | PVC PS | | |
|---|---|---|---|---|
| Adhesion Promoter (wt. %) | | 0.0 | 2.0 | 5.0 |
| Oscillating rheology | | | | |
| Yield value Dosing (Pa) | Crossover | 961 | 648 | 518 |
| Yield value Sag resistance (Pa) | Crossover | 351 | 318 | 257 |
| Viscoelasticity G" (Pa) | G" @ 840 s | 529 | 356 | 249 |
| Flow behavior during application (Pa · s) | η @ 720 s | 48.0 | 41.1 | 35.8 |
| Viscosity decrease (Pa · s) | | 12.0 | 14.6 | 12.0 |
| Flow behavior after application | η @ 980 s | 190.0 | 117.0 | 83.2 |

TABLE 5

Rheology performance of adhesion promotor of example 3
Example 3

| Sample | | PVC PS | | |
|---|---|---|---|---|
| Adhesion Promoter (wt. %) | | 0.0 | 2.0 | 5.0 |
| Oscillating rheology | | | | |
| Yield value Dosing (Pa) | Crossover | 961 | 616 | 512 |
| Yield value Sag resistance (Pa) | Crossover | 351 | 278 | 260 |
| Viscoelasticity G" (Pa) | G" @ 840 s | 529 | 308 | 256 |
| Flow behavior during application (Pa · s) | η @ 720 s | 48.0 | 40.4 | 35.5 |
| Viscosity decrease (Pa · s) | | 12.0 | 12.3 | 12.6 |
| Flow behavior after application | η @ 980 s | 190.0 | 111.0 | 83.8 |

The invention claimed is:

1. A plastisol composition comprising
   (a) at least one vinyl chloride polymer selected from the group consisting of polyvinylchlorides and copolymers of vinyl chloride with one or more monomers;
   (b) at least one plasticizer;
   (c) at least one epoxy resin; and
   (d) at least one isocyanate resin blocked with cardanol.

2. The plastisol composition of claim 1, wherein the at least one isocyanate resin is a polyisocyanate resin, polyisocyanate polymer resin, urethane prepolymer of polyisocyanate resin, or a mixture thereof.

3. The plastisol composition of claim 2, wherein the polyisocyanate resin is a diisocyanate represented by the general formula:

wherein A is a benzene or naphthalene ring; NCO is an isocyanate group; Z is a halogen atom or alkyl or alkoxyl group having at most 3 carbon atoms and n is 0, 1 or 2.

4. The plastisol composition of claim 3, wherein the diisocyanate is selected from the group consisting of 2,4-toluene diisocyanate, 2,6-toluene diisocyanate, 1,4-naphthylene diisocyanate, 1,5-naphthylene diisocyanate, 1,3-phenylene diisocyanate, 1,4-phenylene diisocyanate, and 1-isopropylbenzene 2,4-diisocyanate.

5. The plastisol composition of claim 2, wherein the polyisocyanate resin is a diisocyanate represented by the general formula:

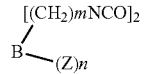

wherein B is a benzene or naphthalene ring; (CH$_2$)m NCO is an alkylene isocyanate group; Z is a halogen atom or alkyl or alkoxy group having at most 3 carbon atoms; m is 1 or 2 and n is 1 or 2.

6. The plastisol composition of claim 5, wherein the diisocyanate is selected from the group consisting of ω,ω'-diisocyanate-1,2-dimethylbenzene, and ω,ω'-diisocyanate-1,3-dimethylbenzene.

7. The plastisol composition of claim 2, wherein the polyisocyanate resin is a diisocyanate represented by the general formula:

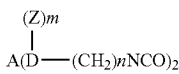

wherein A is an alkylene group having at least 3 carbon atoms; D is a benzene or naphthalene ring; Z is a halogen atom or alkyl or alkoxy group having at most 3 carbon atoms and n is 0, 1 or 2.

8. The plastisol composition of claim 7, wherein the diisocyanate is selected from the group consisting of 4,4'-diphenylmethane diisocyanate, 2,2'-dimethyldiphenylmethane 4,4'-diisocyanate, diphenyldimethylmethane 4,4'-diisocyanate, and 3,3'-dichlorodiphenyldimethylmethane 4,4'-diisocyanate.

9. The plastisol composition of claim 2, wherein the polyisocyanate resin is a diisocyanate represented by the general formula:

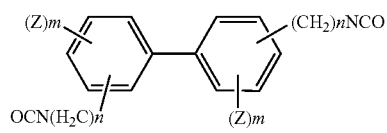

wherein Z is a halogen atom or alkyl or alkoxy group having at most 3 carbon atoms; m is 0 or 1 and n is 0, 1 or 2.

10. The plastisol composition of claim 9, wherein the diisocyanate is selected from the group consisting of biphenyl 2,4'-diisocyanate, biphenyl 4,4'-diisocyanate, 3,3'-di methyl biphenyl 4,4'-diisocyanate, and 3,3'-dimethoxybiphenyl 4,4'-diisocyanate.

11. The plastisol composition of claim 1, wherein the at least one plasticizer is selected from the group consisting of phthalates, mixed alkyl phthalates, adipates, sebacates, phosphates, trimellitates, and combinations thereof.

12. The plastisol composition of claim 1, wherein the at least one epoxy resin is selected from the group consisting of aromatic epoxy resin, alicyclic epoxy resin, aliphatic epoxy resin, glycidyl ester resin, thioglycidyl ether resin, N-glycidyl ether resin, and combinations thereof.

13. The plastisol composition of claim 12, wherein the at least one epoxy resin comprises a glycidyl ether of polyhydric phenol.

14. The plastisol composition of claim 12, wherein the at least one epoxy resin comprises at least one glycidyl ether selected from the group of glycidyl ethers of: resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane, bis-(4-hydroxyphenyl)-methane, novolac resins, and combinations thereof.

15. The plastisol composition of claim 12, wherein the at least one epoxy resin comprises at least one dihydric phenol of the following structure:

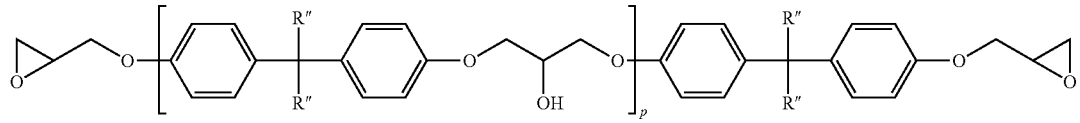

wherein R' is a divalent hydrocarbon radical of a dihydric phenol, and p is an average value between 0 and about 7.

16. The plastisol composition of claim 12, wherein the at least one epoxy resin comprises at least one multifunctional epoxy resin selected from the group consisting of the diglycidyl ether of bisphenol-A, derivative of diglycidyl ether of bisphenol-A,-and diglycidyl ether of bisphenol-F.

17. The plastisol composition of claim 16, wherein the at least one epoxy resin comprises at least one multifunctional epoxy resin of the following structure:

wherein R" is H or $CH_3$, and p is an average value between 0 and about 7.

18. The plastisol composition of claim 1, wherein the amount of cardanol is 1 to 2 times by molar equivalent the isocyanate resin.

* * * * *